(12) United States Patent
Bischoff et al.

(10) Patent No.: US 6,938,915 B2
(45) Date of Patent: Sep. 6, 2005

(54) VEHICLE RESTRAINT SYSTEM FOR A CHILD

(75) Inventors: Robert C. Bischoff, Saratoga, CA (US); Melinda Elisa Maxfield, Homewood, CA (US); Kerry Ellen Williams, San Jose, CA (US)

(73) Assignee: Go-Go Babyz Corp., San Jose, CA (US)

( * ) Notice: Subject to any disclaimer, the term of this patent is extended or adjusted under 35 U.S.C. 154(b) by 137 days.

(21) Appl. No.: 10/448,516

(22) Filed: May 30, 2003

(65) Prior Publication Data

US 2004/0239079 A1 Dec. 2, 2004

(51) Int. Cl.[7] .............................................. B62B 1/00
(52) U.S. Cl. .................................... 280/658; 280/47.25
(58) Field of Search .............................. 280/657, 658, 280/47.25, 63, 87.051; 297/256.1, 256.16

(56) References Cited

U.S. PATENT DOCUMENTS

| | | | |
|---|---|---|---|
| 2,720,911 A | 10/1955 | Lantz | |
| 4,678,196 A | 7/1987 | Van Steenburg | |
| 4,685,688 A * | 8/1987 | Edwards | 280/30 |
| 4,733,909 A * | 3/1988 | Single et al. | 297/256.13 |
| 4,872,693 A | 10/1989 | Kennel | |
| 4,874,182 A * | 10/1989 | Clark | 280/30 |
| 5,104,134 A * | 4/1992 | Cone | 280/30 |
| 5,398,951 A | 3/1995 | Ryu | |
| 5,524,964 A * | 6/1996 | Weimersheimer | 297/256.12 |
| 6,158,807 A | 12/2000 | Hampton | |
| 6,283,545 B1 * | 9/2001 | Ernst | 297/256.16 |
| 6,367,821 B2 * | 4/2002 | Thiele | 280/30 |
| 6,692,073 B1 * | 2/2004 | Weathersby | 297/256.16 |
| 6,729,630 B2 * | 5/2004 | Szmidt et al. | 280/47.25 |

* cited by examiner

*Primary Examiner*—Christopher P. Ellis
*Assistant Examiner*—Brian Swenson
(74) *Attorney, Agent, or Firm*—Burgess & Bereznak, LLP (57) ABSTRACT

A vehicle restraint system for a child includes a child car seat having a body with a back and a bottom, the bottom having one or more openings. A base unit that fits in a passenger seat of a vehicle has a top with one or more members, each of which is adapted for mated insertion into the one or more openings. A resilient insertion member locks the child car seat to the base unit. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

46 Claims, 7 Drawing Sheets

VEHICLE RESTRAINT SYSTEM FOR A CHILD

FIELD OF THE INVENTION

The present invention relates generally to vehicle restraint systems, more specifically, to car seats for infants and toddlers.

BACKGROUND OF THE INVENTION

Child car seats are well known in the prior art. Child car seats are typically secured in the vehicle by a seat belt. The seat belt may attach directly to the car seat, or to a base unit. In either case, removal of the car seat from the vehicle generally requires that it be lifted in a vertical direction from the base or directly from the seat. The awkwardness of this lifting motion is difficult and can strain the back and shoulder muscles or cause injury.

An example of an infant restraining seat providing a platform adapted to rest on and be secured in position on a vehicle seat is disclosed in U.S. Pat. No. 6,158,807. U.S. Pat. No. 4,872,693 discloses another type of removable child car seat that can also function as a stroller. Combination stroller-infant seats that can be converted from one form to the other are also described in U.S. Pat. Nos. 5,398,951; 4,678,196; and 2,720,911. Many of these prior art infant restraining seats and stroller-infant seats are quite complicated, lack versatility in use, and are cumbersome or arduous to deal with.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

The present invention provides an ergonomic child car seat for removable attachment to a base unit secured to a passenger seat of a vehicle. The child car seat includes wheels for mobile transport of a child upon removal of the car seat from the base unit. In the following description numerous specific details are set forth, such as materials, mechanisms, angles, dimensions, etc., in order to provide a thorough understanding of the present invention. Persons having ordinary skill in the mechanical arts, however, will appreciate that these specific details may not be needed to practice the present invention.

Figure 1A:
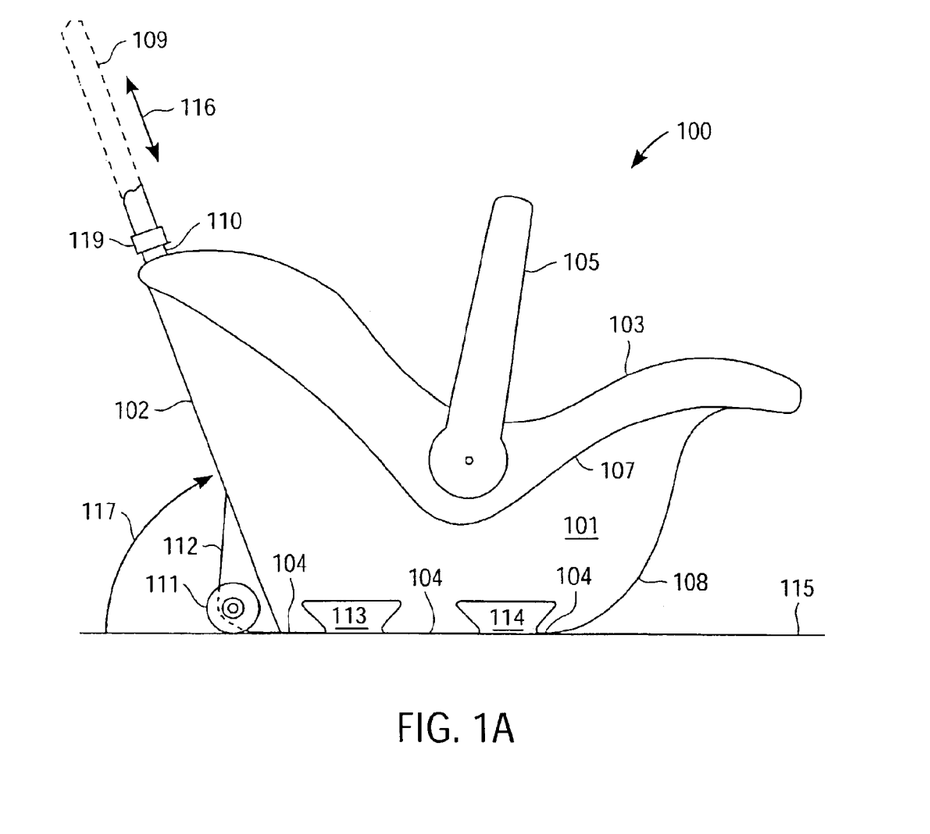
FIG. 1A is a side view of a child car seat according to one embodiment of the present invention.

Referring to FIG. 1A there is shown is a side view of a child car seat 100 according to one embodiment of the present invention. Child car seat 100 comprises a support shell body 101 that includes a back 102, a front 108, a recessed seat 107, and a bottom 104. Support shell 101 may be constructed of thermal plastic materials, but other types of material may be used as well such as chromed tubular steel. A cushioned seat cover 103 fits over recessed seat 107. Seat cover 103 may comprise soft foam, or a similar material, covered within a durable vinyl or cloth case. A child retaining bar 105 is made of plastic or other durable material and is fastened to the outer sides of support shell 101.

Child car seat 100 also includes a handle assembly (more clearly shown in FIG. 5) having a fixed portion attached to, or integral with, back 102 of support shell 101. A telescopic portion of the handle assembly comprises a pair of inner tubes or rods 109 retractably received by a corresponding pair of outer tubes 110 of larger diameter associated with the fixed portion. A horizontal gripping bar 410 (see FIG. 6) connects the pair of telescopically extending inner rods 109. Telescopic portion 109 extends in a direction shown by arrow 116.

Figure 6:
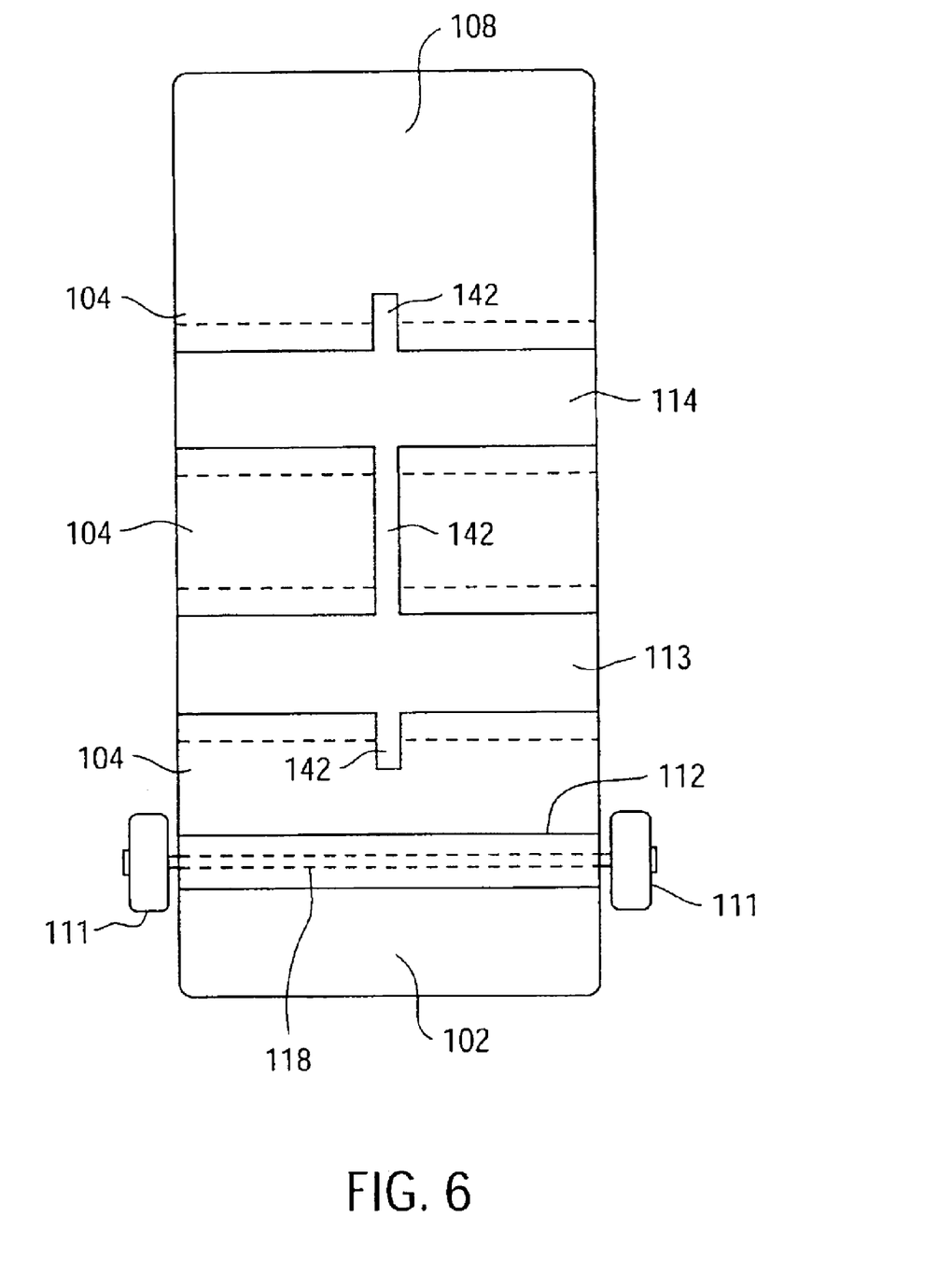
FIG. 6 is a bottom view of the child car seat of FIG. 1A.

The handle assembly may include any one of a number of conventional locking mechanisms utilized for positioning the gripping bar 410 at a desired height or extended position. Such locking mechanisms are well known in the luggage arts. For example, a pair of compression fittings 119 that tighten against rods 109 when twisted may be utilized, as shown. Other alternative mechanisms include conventional handle-actuated latching mechanisms such as the type that locks the inner rods 109 to outer tubes 110 when a latch built into handle gripping bar 410 is engaged. Squeezing the grip disengages the latch to allow inner rods 109 to move within outer tubes 110 so they may be extended or retracted to a new position.

Figure 4:
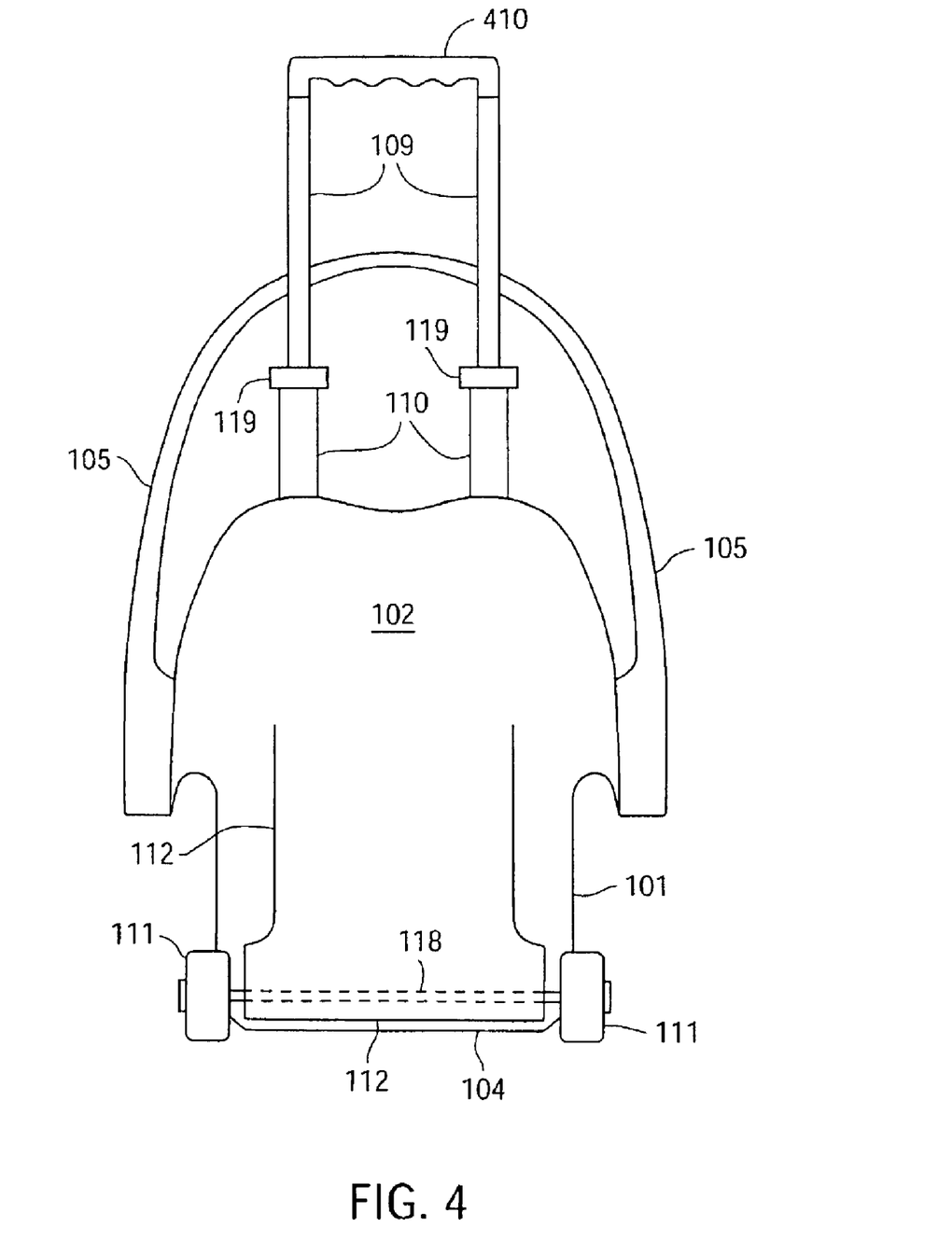
FIG. 4 is a rear view of the child car seat of FIG. 1A.

A pair of wheels 111 is axially affixed to a protruding section 112 of back 102. By way of example, the rear view of FIG. 4 shows wheels 111 affixed to an axle 118 that extends through section 112 of support shell 101. Alternatively, wheels 111 may comprise a wheel/bearing/truck assembly (of a type commonly utilized in skateboards) bolted or otherwise attached to back 102. It should be understood that even though the embodiment of FIG. 4 shows outer tubes 110 embedded within or integral with back portion 102 of the child car seat 100, other embodiments may include an externally attached telescopic handle assembly.

FIG. 1A shows child car seat 100 in a stationary position with bottom 104 in contact with a ground surface 115. In one embodiment, wheels 111 do not contact, or just barely contact, ground surface 115 when in a stationary position. In another embodiment, wheels 111 contact ground surface 115 such that the rear portion of bottom 104 is slightly raised off of ground surface 115, and child car seat 100 rests on the front portion of bottom 104 when in the stationary position. In the exemplary embodiment of FIG. 1A, the angle (shown by arrow 117) between back portion 102 and ground surface 115 when child car seat 100 is in a stationary position is in the range of 55 to 60 degrees. In such an embodiment, an obtuse angle thus exists between back portion and bottom 104.

Figure 5:
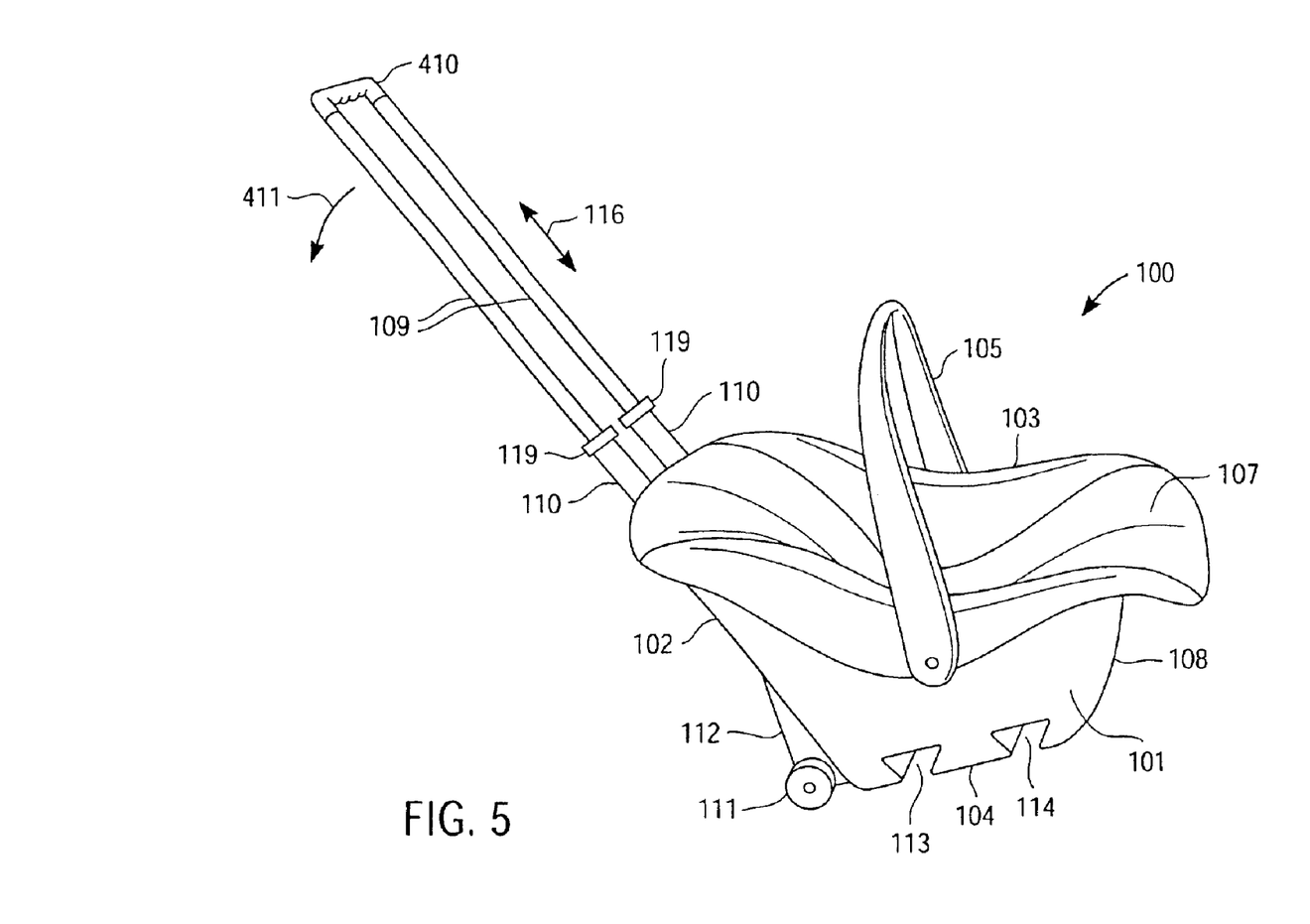
FIG. 5 is a perspective view of a child car seat according to one embodiment of the present invention in a mobile position.

To transport a child positioned in recessed seat 107, the parent or guardian tilts child car seat 100 by pushing back and/or down on the handle gripping bar 410 in a direction indicated by arrow 411 of FIG. 5. This causes child car seat 100 to pivot back onto wheels 111 such that the weight of child car seat rests entirely on wheels 111. In other words, child car seat 100 is tilted back so as to lift bottom 104 off ground surface 115. This mobile position, in which child car seat 100 is pivoted onto wheels 111, is shown in FIG. 5. In this mobile position, the parent or guardian can transport a child positioned in cushioned recessed seat 107 by pushing (or pulling) child car seat 100 over the ground.

Bottom 104 of child car seat 100 includes a pair of dovetail openings or slots 113 and 114 that extend through support shell 101 from one sidewall to the other. Slots 113 and 114 are formed to receive corresponding interlocking dovetail members 131 and 132, respectively, of a base unit 120 (see FIG. 1B). Dovetail members 131 and 132 and the upper surface 121 of base unit 120 may comprise a waxy plastic material having a low coefficient of friction to facilitate sliding of support shell 101 of child car seat 100 onto or off of base unit 120.

Figure 1B:
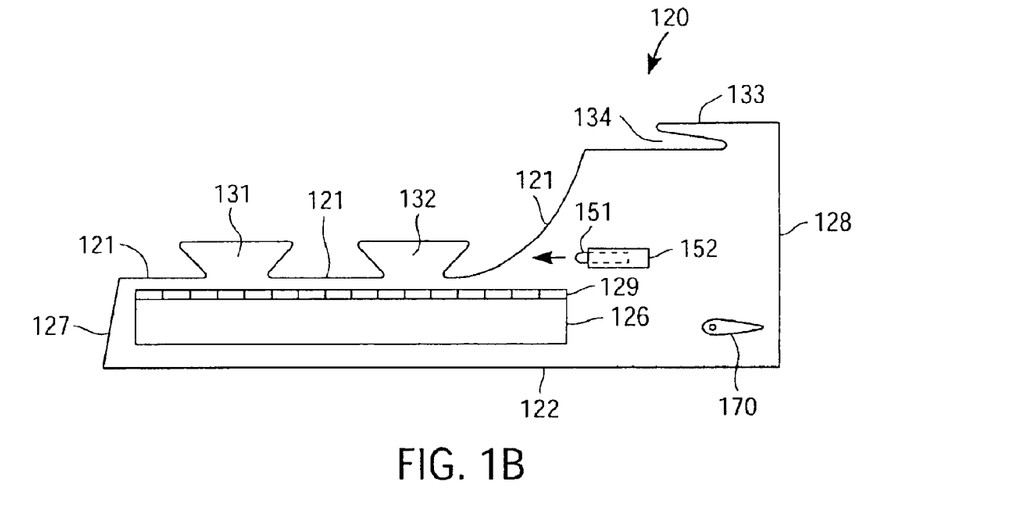
FIG. 1B is a side view of one embodiment of a base unit utilized with the child car seat shown in FIG. 1A.
Figure 1C:
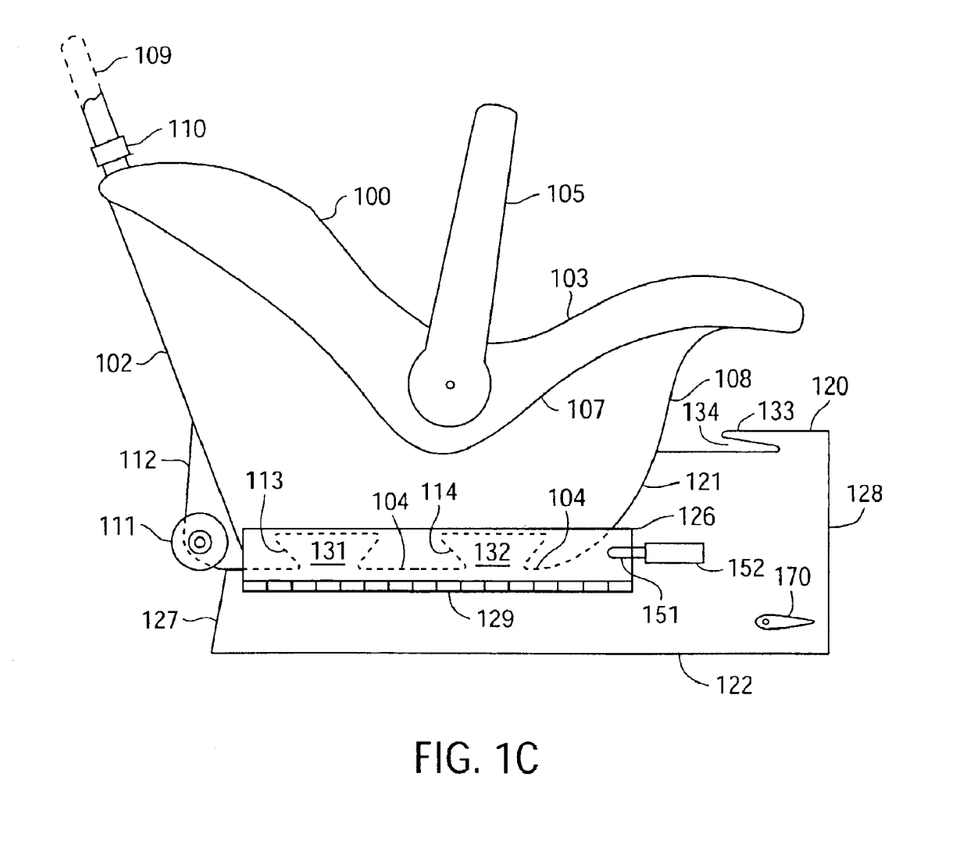
FIG. 1C shows the child car seat and base unit of FIGS. 1A & 1B in a secured or mated configuration.

In the embodiment of FIGS. 1A–1C, dovetail slots 113 and 114 run completely through the bottom portion 104 of child car seat 100 from one side to the other. Additionally, the width of child car seat 100 is substantially the same as that of base system 120. Other embodiments may implement variations of this design. For example, a child car seat may have only one dovetail slot, corresponding to one dovetail member on the base unit, is also possible. Still other embodiments may utilize three or more interlocking members/slots to secure child car seat to base unit 120.

It is also understood that dovetail slots 113 and 114 may run only partially through shell 101 of child car seat 100. Another possibility is to configure bottom 104 of child car seat 100 to be smaller in width than the width of base unit 120. In other words, a wide variety of configurations other than those shown and discussed in the present specification are possible.

Base unit 120 is secured to a passenger seat of a vehicle using the vehicle's seat belt. Bottom 104 of child car seat 100 is then slid in a sideways or horizontal motion so that members 131 and 132 fit into respective openings 113 and 114 to secure car seat 100 to base unit 120 within the vehicle. In other words, the dovetail relationship of members 131 & 132 mated to slots 113 and 114, respectively, securely attaches child car seat 100 to base unit 120.

Figure 2:
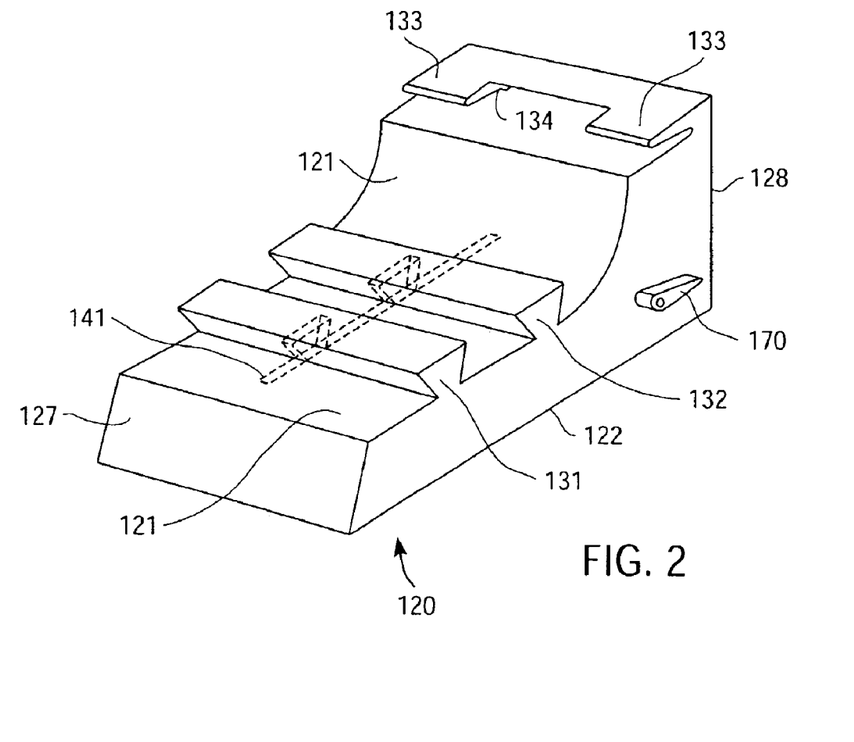
FIG. 2 is a perspective view of the base unit of FIG. 1B.

To prevent car seat 100 from sliding sideways, a resilient base plate is raised into a transverse slot 141 that passes through a portion of members 131 & 132 (see FIG. 2). This slot is aligned with a corresponding transverse slot 142 (see FIG. 6) that extends in a direction from front 108 to back 102 along bottom 104 of child car seat 100. This aspect of the invention will be described in more detail shortly.

FIG. 1B is a side view of base unit 120 according to one embodiment of the present invention. A perspective view of base unit 120 is provided in FIG. 2. Base unit 120 has an upper surface 121 fitted to match bottom 104 of child car seat 100. Bottom 104 rests against upper surface 121 when child car seat 100 is mated to base unit 120 during transportation in a vehicle. A lower surface 122 of base unit 120 is adapted to be received upon a passenger seat of a vehicle. A rear side 128 of base unit 120 fits against the back portion of the vehicle's passenger seat. A front side 127 of base unit 120 faces the direction of travel of the vehicle.

Seat belt attachment brackets or flanges 133 are provided on the top rear portion of the base unit 120. To secure base unit 120 to the seat of the vehicle the seat lap belt is passed through the slots or openings 134 formed by brackets 123. It is appreciated that other embodiments may include more than two brackets, or just a single, extended bracket 133. A wide variety of alternative seat belt attachment techniques may also be utilized to secure base unit 120 to a vehicle's passenger seat.

With continuing reference to FIG. 1B, a rigid sidewall panel 126 is shown attached to the side of base unit 120 via a hinge 129. An identical second hinged sidewall panel (not shown in this view) may be attached to the opposite side of base unit 120 in the embodiment of FIG. 1B. Sidewall panel 126 may be fabricated, for example, utilizing thermal plastic materials or from hard-wear resistant material such as aluminum or steel. When child car seat 100 is mated to base unit 120 by sliding dovetail openings 113 & 114 over members 131 & 132, sidewall panel 126 may be raised to secure child car seat 100 to base system 120. FIG. 1C shows this mated relationship, with sidewall panel 126 raised to hold child car seat 100 in position on base unit 120.

A latch assembly comprising a finger 151 and sleeve 152 is also shown attached to the side of base unit 120. When sidewall panel 126 is in a raised position, finger 151 may be extended to hold panel 126 in place. Other conventional latching mechanisms may also be used. When sidewall panel 126 is in a raised or closed position as shown in FIG. 1C, the child car seat 100 is prevented from sliding laterally on base unit 120. A corresponding latching mechanism may also be provided on the opposite side (not shown in this view) of the base system 120. When hinged sidewall panel 126 is lowered child car seat 100 may be slideably removed from that side of base unit 120.

Figure 3A:
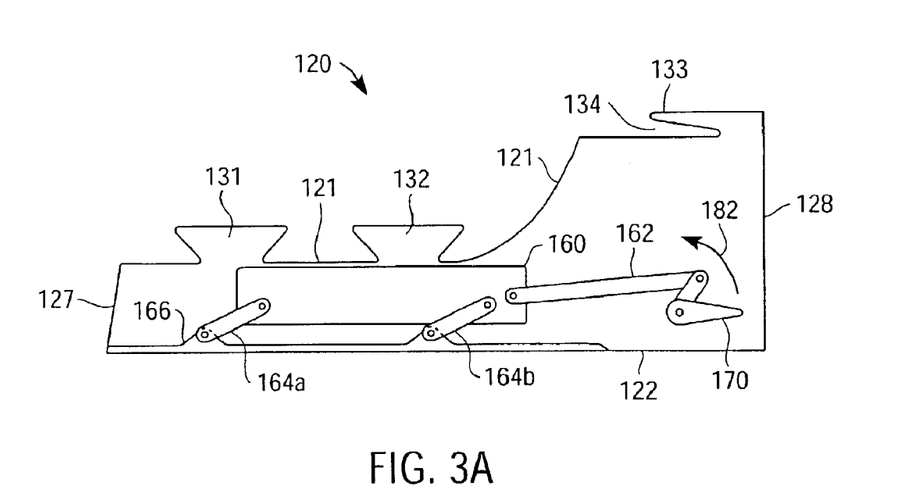
FIGS. 3A & 3B are cut-away side views of the base unit of FIG. 1B showing a center locking mechanism in open and secure positions, respectively.
Figure 3B:
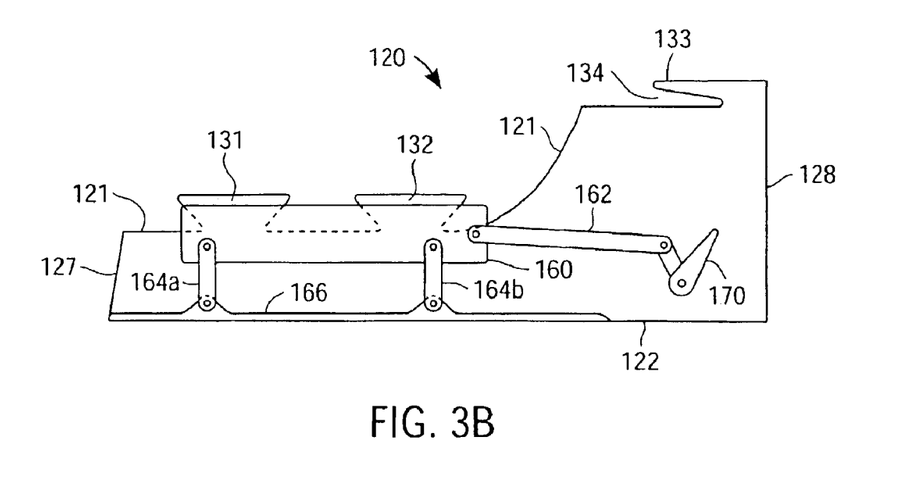

According to another aspect of the present invention, a center locking mechanism may be actuated to further prevent child car seat 100 from sliding sideways off of base unit 120. FIGS. 3A & 3B are cut-away side views of base unit 120 showing the center locking mechanism in unlocked and locked positions, respectively, according to one embodiment of the present invention. The locking mechanism comprises a rigid center plate 160 that is raised or lowered by turning a knob or lever 170 located on a side of base unit 120. Lever 170 is axially coupled to mechanical linkage arm 162 axially connected to a proximate end of center plate 160. First and second linkage legs 164a & 164b are axially connected to distal and proximate ends of center plate 160, and also to a spine 166 located along the inside surface of bottom 122 of base unit 120.

Rotating lever 170 in a direction shown by arrow 182 causes linkage arm 162 to push center plate 160 up through slot 141 in upper surface 121 of base unit 120 (see FIG. 2). Slot 141 extends in a transverse direction from front side 127 toward rear side 128. Slot 141 also passes through a portion of each of dovetail members 131 & 132 to a height that allows center plate 160 to be fully raised, as shown in FIG. 3B.

A corresponding slotted opening 142 is located along a transverse direction of bottom 104 of child car seat 100, as shown in FIG. 6. When child car seat 100 is mated to base unit 120 and centered such that sidewall panels 126 may be raised and latched, respective transverse slots 141 & 142 in base unit 120 and child car seat 100 are aligned. In this configuration, actuation of lever 170 causes center plate to be raised to a locking position in which plate 160 fits within transverse slots 141 & 142. This locked position prevents child car seat from moving laterally over base unit 120.

Although the present invention has been described in conjunction with specific embodiments, numerous modifications and alterations are well within the scope of the present invention. For example, instead of a base unit with trapezoidal shaped dovetail members, T-shaped or other rectilinear or curvilinear shaped members may be used with corresponding shaped openings in the bottom of child car seat. Accordingly, the specification and drawings are to be regarded in an illustrative rather than a restrictive sense.

What is claimed is:

1. A child car seat system, comprising:
   a child car seat that includes:
      a body having a recessed seat, a back, and a bottom surface;
      a handle assembly affixed to the back of the body; and
      a plurality of wheels, the plurality of wheels being rotatably attached only to the back near the bottom surface;
   a base unit that fits in a passenger seat of a vehicle, the base unit having a top with one or more members each of which is adapted for secured attachment to the bottom surface of the body;
   wherein in a mobile position disengaged from the base unit, the child car seat resting on the wheels with the bottom lifted off a ground surface, and in a stationary position disengaged from the base unit the child car seat resting upon at least a portion of the bottom surface.

2. The child car seat system of claim 1 wherein the handle assembly comprises a gripping portion attached to a pair of rods telescopically coupled with a corresponding pair of outer tubes, the outer tubes being affixed to the back.

3. The child car seat system of claim 1 wherein the handle assembly is integral with the body.

4. The child car seat system of claim 1 wherein the body comprises a molded shell of thermoplastic material.

5. The child car seat system of claim 2 wherein the handle assembly further comprises a locking mechanism to lock the rods in a fixed position with respect to the outer tubes.

6. The child car seat system of claim 1 wherein an obtuse angle exists between the back and the bottom surface.

7. The child car seat system of claim 1 further comprising a retaining bar attached to opposite sides of the body.

8. The child car seat system of claim 1 wherein the wheels and the handle are mounted to an external surface of the back.

9. The child car seat system of claim 1 further comprising one or more openings on the bottom surface of the body adapted to receive corresponding interlocking members of a base unit.

10. A vehicle restraint system for a child, comprising:
    a child car seat that includes a body with a back and a bottom, the bottom having one or more openings;
    a base unit that fits in a passenger seat of a vehicle, the base unit having a top with one or more members each of which is adapted for mated insertion into the one or more openings;
    means for locking the child car seat to the base unit, the locking means including a resilient plate connected to a mechanical linkage affixed to an inside surface of the base unit, the mechanical linkage for raising and lowering the resilient plate through a transverse slot in the top of the base unit, the bottom of the child car seat having a corresponding transverse slot to receive the resilient plate when in a raised position; and
    means for securing the base unit to the passenger seat.

11. The vehicle restraint system of claim 10 wherein the transverse slot of the top of the base unit extends at least partially through the one or more members.

12. The vehicle restraint system of claim 10 wherein the securing means comprises one or more brackets disposed on the top of the base unit to receive a seat belt.

13. The vehicle restraint system of claim 10 wherein the one or more members comprise a pair of trapezoidal-shaped members.

14. The vehicle restraint system of claim 10 wherein the body comprises a molded shell of thermoplastic material.

15. The vehicle restraint system of claim 10 wherein the one or more openings of the child car seat are adapted to be slidably coupled with the one or more members of the base unit.

16. The vehicle restraint system of claim 10 further comprising a handle assembly affixed to the back of the body.

17. The vehicle restraint system of claim 10 further comprising:
    a sidewall panel hinged to a side of the base unit; end
    a panel locking mechanism to hold the sidewall panel in a raised position in which an edge of the sidewall panel substantially adjoins a top surface of the one or more members so as to prevent the child car seat from sliding off the base unit.

18. The vehicle restraint system of claim 10 wherein the child car seat further includes a pair of wheels rotatably attached to the back of the body near the bottom, the pair of wheels for moving the child car seat over a ground surface when the child car seat is disengaged from the base unit.

19. A vehicle restraint system for a child, comprising:
    a child car seat that includes a body with a back and a bottom, the bottom having one or more openings, and a pair of wheels rotatably attached to the back proximate the bottom, the wheels for moving the child car seat over a ground surface when the child car seat is disengaged from the base unit;
    a base unit that fits in a passenger seat of a vehicle, the base unit having a top with one or more members each of which is adapted for mated sideways insertion into the one or more openings; and
    a resilient insertion member to lock the child car seat to the base unit.

20. The vehicle restraint system of claim 19 further comprising a bracket disposed on the top of the base unit to receive a lap seat belt.

21. The vehicle restraint system of claim 19 wherein the one or more members comprise a pair of trapezoidal-shaped members.

22. The vehicle restraint system of claim 19 wherein the body comprises a molded shell of thermoplastic material.

23. The vehicle restraint system of claim 19 wherein the one or more openings of the child car seat are adapted to be slidably coupled with the one or more members of the base unit.

24. The vehicle restraint system of claim 19 further comprising a handle assembly affixed to the back of the body.

25. The vehicle restraint system of claim 19 further comprising:
    a sidewall panel hinged to a side of the base unit; and
    a panel locking mechanism to hold the sidewall panel in a raised position in which an edge of the sidewall panel substantially adjoins a top surface of the one or more members so as to prevent the child car seat from sliding off the base unit.

26. The vehicle restraint system of claim 19 wherein the resilient insertion member comprises a rigid plate connected to a mechanical linkage affixed to an inside surface of the base unit, the mechanical linkage for raising and lowering the rigid plate through a transverse slot in the top of the base unit, the bottom of the child car seat having a corresponding transverse slot to receive the rigid plate when in a raised position.

27. The vehicle restraint system of claim 26 wherein the transverse slot of the top of the base unit extends at least partially through the one or more members.

28. A vehicle restraint system for a child, comprising:
a child car seat that includes a body with a back and a bottom, the bottom having one or more openings;
a base unit that fits in a passenger seat of a vehicle, the base unit and the child car seat each having a substantially identical width, the base unit having a top with one or more members each of which is adapted for mated, slidable insertion into the one or more openings in a sideways direction; and
means for locking the child car seat to the base unit; and
wherein the child car seat further includes a pair of wheels rotatably attached to the back of the body near the bottom, the pair of wheels for moving the child car seat over a ground surface when the child car seat is disengaged from the base unit.

29. The vehicle restraint system of claim 28 further comprising a bracket disposed on the top of the base unit to receive a lap seat belt.

30. The vehicle restraint system of claim 28 wherein the one or more members comprise a pair of trapezoidal-shaped members.

31. The vehicle restraint system of claim 28 wherein the body comprises a molded shell of thermoplastic material.

32. The vehicle restraint system of claim 28 further comprising:
a sidewall panel hinged to a side of the base unit; and
a panel locking mechanism to hold the sidewall panel in a raised position in which an edge of the sidewall panel substantially adjoins a top surface of the one or more members so as to prevent the child car seat from sliding off the base unit.

33. The vehicle restraint system of claim 28 wherein the means comprises a rigid plate connected to a mechanical linkage affixed to an inside surface of the base unit, the mechanical linkage for raising and lowering the rigid plate through a transverse slot in the top of the base unit, the bottom of the child car seat having a corresponding transverse slot to receive the rigid plate when in a raised position.

34. The vehicle restraint system of claim 33 wherein the transverse slot of the top of the base unit extends at least partially through the one or more members.

35. The vehicle restraint system of claim 28 further comprising a handle assembly affixed to the back of the body.

36. The vehicle restraint system of claim 35 wherein the handle assembly comprises a gripping portion attached to a pair of rods telescopically coupled with a corresponding pair of outer tubes, the outer tubes being affixed to the back.

37. A vehicle restraint system for a child, comprising:
a child car seat that includes a body with a back and a bottom, the bottom having one or more openings, and a plurality of wheels attached only to the back proximate the bottom;
a base unit that fits in a passenger seat of a vehicle, the base unit having a top with one or more members each of which is adapted for mated, slidable insertion into the one or more openings in a sideways direction, the one or more members and the one or more openings having interlocking shapes so as to secure the child car seat to the base unit in all directions except the sideways direction; and
a mechanism to lock the child car seat to the base unit, thereby preventing movement of the child car seat relative to the base unit in the sideways direction.

38. The vehicle restraint system of claim 37 wherein the base unit further includes one or more brackets to receive a seat belt for securing the base unit to the passenger seat.

39. The vehicle restraint system of claim 37 wherein the mechanism comprises a resilient plate connected to a mechanical linkage affixed to an inside surface of the base unit, the mechanical linkage for raising and lowering the resilient plate through a transverse slot in the top of the base unit, the bottom of the child car seat having a corresponding transverse slot to receive the resilient plate when in a raised position, the transverse slot extending at least partially through the one or more members.

40. The vehicle restraint system of claim 37 wherein the one or more members comprise a pair of trapezoidal-shaped members.

41. The vehicle restraint system of claim 37 wherein the base unit and the child car seat each have a width that is substantially the same.

42. The vehicle restraint system of claim 37 wherein the one or more members and the one or more openings have interlocking shapes so as to secure the child car seat to the base unit in all directions except sideways.

43. A vehicle restraint system for a child, comprising:
a child car seat that includes a body with a back and a bottom, the bottom having one or more openings, and a plurality of wheels attached only to the back proximate the bottom;
a base unit that fits in a passenger seat of a vehicle, the base unit having a top with one or more members each of which is adapted for mated sideways insertion into the one or more openings;
a sidewall panel hinged to a side of the base unit; and
a panel locking mechanism to hold the sidewall panel in a raised position in which an edge of the sidewall panel substantially adjoins a top surface of the one or more members so as to prevent the child car seat from sliding sideways off the base unit.

44. A vehicle restraint system for a child, comprising:
a child car seat that includes a body with a back and a bottom, the bottom having one or more openings, and a plurality of wheels attached only to the back proximate the bottom;
a base unit that fits in a passenger seat of a vehicle, the base unit having a top with one or more members, the child car seat being secured to the base unit by slidable sideways insertion of the one or more members into the one or more openings, the one or more members and the one or more openings having interlocking shapes so as to secure the child car seat to the base unit in all directions except a sideways direction; and
a mechanism to keep the child car seat from sliding off the base unit in the side sideways direction.

45. The vehicle restraint system of claim 44 wherein the base unit and the car seat each have a width that is substantially the same.

46. The vehicle restraint system of claim 44 further comprising:
a sidewall panel hinged to a side of the base unit; and
a panel locking mechanism to hold the sidewall panel in a raised position in which an edge of the sidewall panel substantially adjoins a top surface of the one or more members so as to prevent the child car seat from sliding off the base unit.

* * * * *